(12) United States Patent
Arlaban Gabeiras et al.

(10) Patent No.: US 9,637,944 B2
(45) Date of Patent: May 2, 2017

(54) METHOD FOR ASSEMBLING DECREASING SECTION CONCRETE TOWERS FOR WIND TURBINES AND ASSOCIATED WIND TURBINES

(71) Applicant: Acciona Windpower, S.A., Navarra (ES)

(72) Inventors: Teresa Arlaban Gabeiras, Navarra (ES); Ivan Garcia Maestre, Navarra (ES); Inigo Rubio Guillen, Navarra (ES); Jose Luis Aristegui Lantero, Navarra (ES); Javier Ciaurriz Martin, Navarra (ES); Jose Miguel Garcia Sayes, Navarra (ES); Miguel Nunez Polo, Navarra (ES)

(73) Assignee: Acciona Windpower, S.A., Navarra (ES)

( * ) Notice: Subject to any disclaimer, the term of this patent is extended or adjusted under 35 U.S.C. 154(b) by 0 days.

(21) Appl. No.: 14/813,670

(22) Filed: Jul. 30, 2015

(65) Prior Publication Data
US 2016/0032610 A1    Feb. 4, 2016

(30) Foreign Application Priority Data
Jul. 30, 2014    (ES) .................................. 201431146

(51) Int. Cl.
| | |
|---|---|
| *E04B 1/00* | (2006.01) |
| *E04H 12/34* | (2006.01) |
| *E04H 12/12* | (2006.01) |
| *F03D 13/20* | (2016.01) |

(52) U.S. Cl.
CPC .......... *E04H 12/342* (2013.01); *E04H 12/12* (2013.01); *F03D 13/22* (2016.05); *Y02E 10/728* (2013.01)

(58) Field of Classification Search
CPC ...... E04H 12/342; E04H 12/12; F03D 11/045
USPC ................. 52/123.1, 169.13, 745.17, 745.18
See application file for complete search history.

(56) References Cited

U.S. PATENT DOCUMENTS

| | | | | |
|---|---|---|---|---|
| 5,247,776 | A * | 9/1993 | Tamayo ................. | E21B 15/00 52/111 |
| 9,062,662 | B1 * | 6/2015 | Johnson ................ | E04H 12/342 |
| 2008/0040983 | A1 * | 2/2008 | Fernandez Gomez . | E04H 12/12 52/40 |
| 2009/0031639 | A1 * | 2/2009 | Cortina/Cordero ..... | E04H 12/12 52/40 |

(Continued)

FOREIGN PATENT DOCUMENTS

| | | |
|---|---|---|
| CA | 2887459 A1 | 4/2014 |
| EP | 1889988 A2 | 2/2008 |

(Continued)

*Primary Examiner* — Basil Katcheves
*Assistant Examiner* — Joshua Ihezie
(74) *Attorney, Agent, or Firm* — Hayes Soloway PC

(57) ABSTRACT

The present invention relates to a method for assembling concrete towers with a decreasing sector for wind turbines which comprises a phase of pre-assembly of concrete tower sections which allows to reduce the space required during the stage of pre-assembly of the different tower section prior to lifting and the civil work associated to set said space up wherein, during the pre-assembly phase, a first annular section is confined at least partially within the inner space defined by a second annular section, the invention also relating to the wind turbine associated to said method of assembly.

20 Claims, 7 Drawing Sheets

(56) References Cited

U.S. PATENT DOCUMENTS

| | | |
|---|---|---|
| 2012/0141295 A1* | 6/2012 | Martinez De Castaneda ............ E04H 12/085 416/244 R |
| 2012/0311948 A1* | 12/2012 | Hangel .................... B66C 1/66 52/295 |
| 2014/0102039 A1* | 4/2014 | Wagner .................. F03D 1/001 52/745.18 |
| 2014/0115987 A1* | 5/2014 | Rodriguez Tsouroukdissian ..... E04H 12/34 52/298 |

FOREIGN PATENT DOCUMENTS

| | | |
|---|---|---|
| WO | 2011006526 A1 | 1/2011 |
| WO | 2011135172 A1 | 11/2011 |

* cited by examiner

METHOD FOR ASSEMBLING DECREASING SECTION CONCRETE TOWERS FOR WIND TURBINES AND ASSOCIATED WIND TURBINES

OBJECT OF THE INVENTION

The present invention relates to a method for assembling decreasing section concrete towers for wind turbines which comprises a pre-assembly phase of concrete tower sections which allows to reduce the space required during the pre-assembly stages of the different tower sections prior to lifting of same, and consequently, the material used to carry out the civil works associated with setting said space up.

The object of the invention is a method for assembling concrete towers with a decreasing section which comprises a pre-assembly phase of concrete tower sections wherein a first annular section is confined at least partially in the inner space defined by a second annular section during said pre-assembly phase, and the associated wind turbine.

BACKGROUND OF THE INVENTION

In the last twenty years, the rated power of wind turbines has been gradually increasing thanks to the increase in their rotor diameter, which in turn makes it indispensable to use taller towers. The increase in height can make it essential for the tower to comprise different sections throughout its height, which are placed stacked on top of each other to form the tower and which at the same time are transportable by road or rail. For example, to assemble a tower 100 m tall 5 sections of 20 m in height could be used being stackable on top of each other, while at the same time being transportable with said dimensions by road and rail.

On the other hand, one of the options for achieving taller towers being similarly stable and rigid is to increase the transverse dimensions of the tower gradually from the top part to the base of the tower. Said increase can imply again problems with transporting the sections and a common solution involves dividing them into longitudinal modules. The dimensions of the longitudinal modules allow for their transport by road or rail.

Logically, increasing the rated power of wind turbines entails increasing the weight and dimensions of all turbine components in general, with the following aspects being particularly relevant to the costs of assembly:
  The height of the tower;
  The diameter of the rotor and the weight of the blades-hub;
  The weight of the nacelle and sub-components;
  The weight and diameter of tower segments.

Usually, the pre-assembly stage of sections is carried out in a zone near to the base of the tower, where given the weight of said sections and the irregularity of the ground, it is necessary to carry out civil works to set the ground up mostly by means of levelling and compacting operations, which entail an intensive use of materials and time.

The state of the art has a pre-assembly position for each section, side by side, either surrounding the base of the tower or forming a row to one side of it. These positions are sufficiently distant from each other so that the devices used for the pre-assembly can travel between the different sections during the stages of pre-assembly of each of them.

Also, it is common to use pre-assembly platforms disposed in said positions, on which the precast concrete segments that form a section are assembled, wherein generally one pre-assembly platform is used per section.

Once the precast concrete segments are placed on the pre-assembly platforms and have been adequately positioned to guarantee the section's dimensional tolerances, the vertical joints between the precast concrete segments are executed, normally in concrete.

Given the dimensions of the base of the sections and the space that must be disposed between them, the surface to be set up is large and therefore implies a high cost in human and material resources. This is not always possible as there are locations where the space available is limited due to the irregularity of the ground, such as in locations where the wind turbines are on a peak or close to a cliff.

The present invention solves all the above drawbacks by means of a method for assembling decreasing section concrete towers for wind turbines which comprises a phase of pre-assembly of concrete tower sections which allows to reduce the space required during the stages of pre-assembly of the different sections of the tower prior to lifting and consequently, the material used to carry out the civil works associated to setting said space up.

DESCRIPTION OF THE INVENTION

The present invention relates to a method for assembling decreasing section concrete towers for wind turbines which comprises a preassembly phase of concrete tower sections, wherein the tower comprises at least two stackable annular sections, a first stackable annular section and a second stackable annular section with a greater section than the first stackable annular section, wherein the stackable annular sections comprise in turn at least two precast concrete segments and wherein the pre-assembly phase is carried out in at least one pre-assembly zone near to a base of the tower and comprises the stages of joining at least two precast concrete segments of a stackable annular section carried out for at least the first stackable annular section and the second stackable annular section.

During the pre-assembly phase the at least two precast concrete segments of the first stackable annular section are confined at least partially in the inner space defined by the at least two precast concrete segments of the second stackable annular section.

Optionally, the at least two precast concrete segments of the first stackable annular section are confined at least partially in the inner space defined by the at least two precast concrete segments of the second stackable annular section following the stages of joining the at least two precast concrete segments of the first stackable annular section and of the second stackable annular section.

The phases of joining the at least two precast concrete segments of a stackable annular section carried out for at least the first stackable annular section and the second stackable annular section can be provisional joining stages which are carried out using provisional joining means during part or the entire method for assembling decreasing section concrete towers, or definitive joining stages which have been carried out by means of definitive joining means which are configured to provide the section with the necessary requirements so that once the tower is assembled it can withstand the loads of the wind turbine during its operation.

Optionally, the stage of joining the at least two precast concrete segments of the first stackable annular section is carried out before the stage of joining the at least two precast concrete segments of the second stackable annular section, in such a way that there is complete access from the outside of each stackable annular section when said joining stages are carried out.

Also in an optional manner, the pre-assembly phase comprises, prior to the stages of joining the at least two precast concrete segments of each of the stackable annular sections, a stage of positioning the precast concrete segments.

This stage of positioning can comprise disposing the at least two precast concrete segments of each of the stackable annular sections vertically adjacent to each other, in such a way that the joining flanges between them are disposed adjacent to each other, or can comprise disposing the at least two precast concrete segments of each of the stackable annular sections vertically opposite each other, with the at least two precast concrete segments of each of the stackable annular sections being not adjacent.

In this way, the method for assembling decreasing section concrete towers of the present invention allows to reduce the dimensions of the surface of the ground to be set up for the pre-assembly phase of the sections and, if their use is required, for the location of one of the pre-assembly bases, as the same position is used to carry out the pre-assembly phase for at least two sections of a tower, thus reducing the surface of the ground which has to be set up to withstand the loads associated with the weight of the sections.

Optionally, the stage of positioning the precast concrete segments of the first stackable annular section is carried out with respect to one of the pre-assembly zones and the stage of positioning the precast concrete segments of the second stackable annular section is carried out with respect to the first stackable annular section.

The method for assembling concrete towers with a decreasing section for wind turbines comprises also a phase of stacking a stackable annular section on a stackable annular section immediately below.

PREFERRED EMBODIMENT OF THE INVENTION

Figure 1:
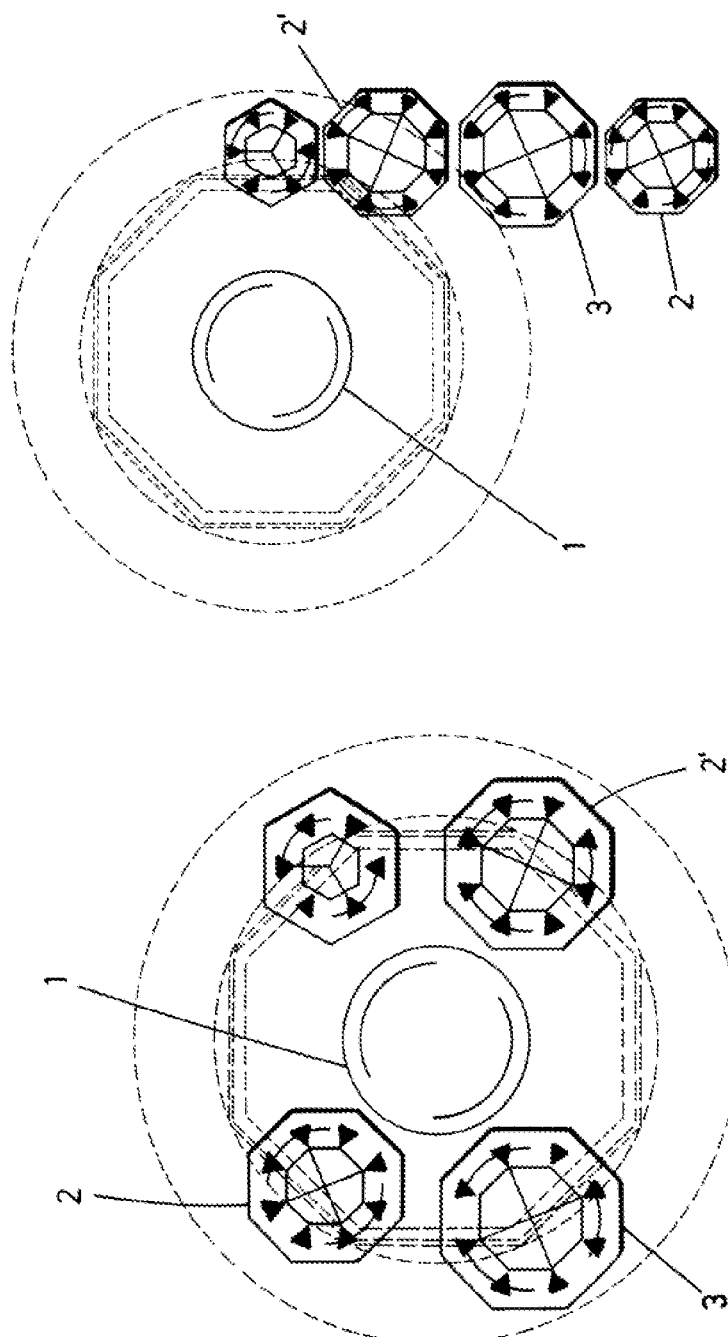
FIG. 1 shows a plan view of two options known in the state of the art wherein the tower section pre-assembly zones are disposed next to each other, or surrounding the base of the tower, or forming a row to one side of it.
Figure 2:
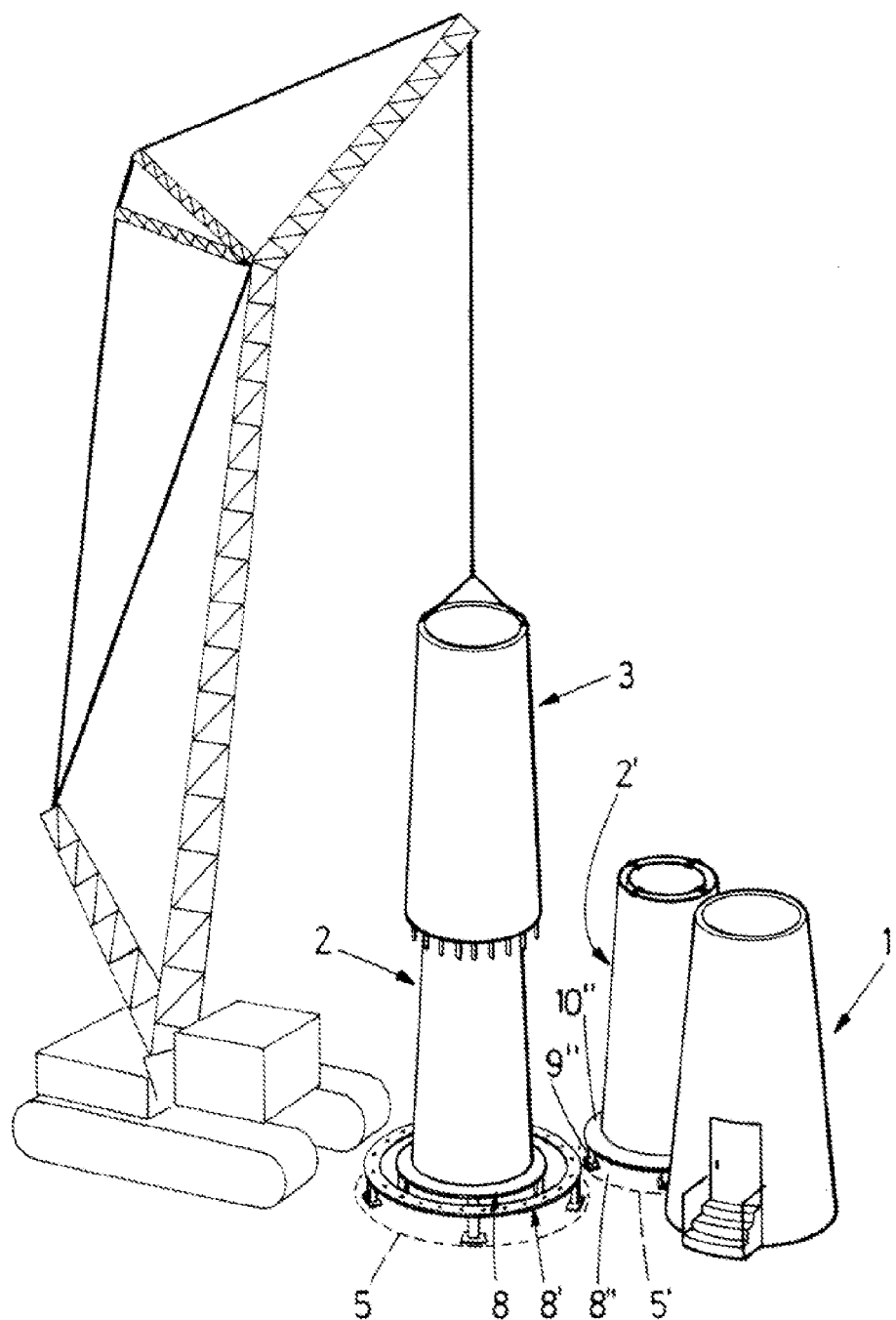
FIG. 2 shows a perspective view of the phase of stacking a stackable annular section on the base of the tower of the method for assembling decreasing section concrete towers for wind turbines of the present invention.
Figure 3:
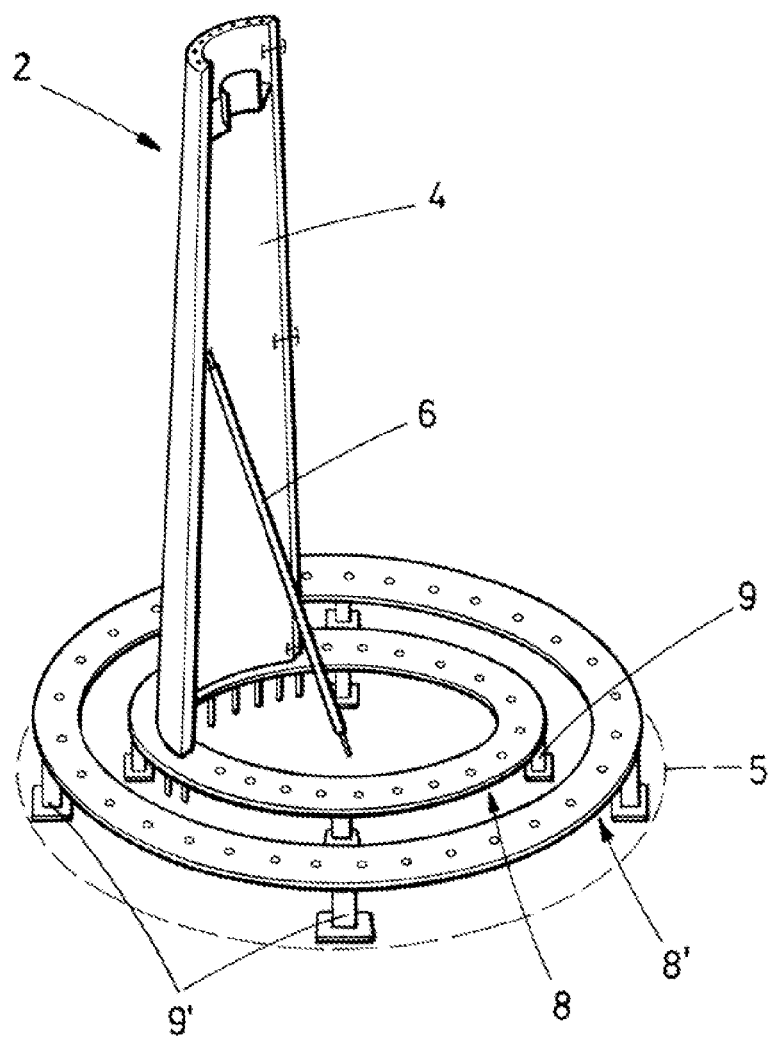
FIG. 3 shows a perspective view of the pre-assembly phase wherein a first stackable annular section is disposed in a first zone of pre-assembly according to the method for assembling decreasing section concrete towers for wind turbines of the present invention.

What follows is a detailed description of the method for assembling decreasing section concrete towers for wind turbines of the present invention.

The method for assembling concrete towers with a decreasing section comprises a pre-assembly phase of concrete tower sections, wherein the tower comprises at least two stackable annular sections (2, 3), a first stackable annular section (2) and a second stackable annular section (3) with a greater section than the first stackable annular section (2), wherein the stackable annular sections (2, 3) comprise in turn at least two precast concrete segments (4) and wherein the pre-assembly phase comprises stages of joining at least two precast concrete segments (4) of a stackable annular section (2, 3) carried out for at least the first stackable annular section (2) and the second stackable annular section (3).

The pre-assembly phase is carried out in at least a first pre-assembly zone (5) near to a base (1) of the tower wherein the at least two precast concrete segments (4) joinable in the stage of joining the first stackable annular section (2) are confined at least partially within the inner space defined by the at least two precast concrete segments (4) of the second stackable annular section (3), wherein the stage of joining the first stackable annular section (2) is carried out before the stage of joining the second stackable annular section (3).

The base (1) of the tower can be a foundation or an annular section mounted directly on said foundation.

In this way, unlike in the current state of the art wherein a pre-assembly position is disposed for each section either next to each other, or surrounding the base of the tower, or forming a row to one side of it as shown in FIG. 1, according to the invention pre-assembly positions of different sections are disposed in a nested manner thereby reducing the space required during the pre-assembly stages of the different sections of the tower prior to lifting and, consequently the material used to carry out the civil works to set said space up.

Figure 4:
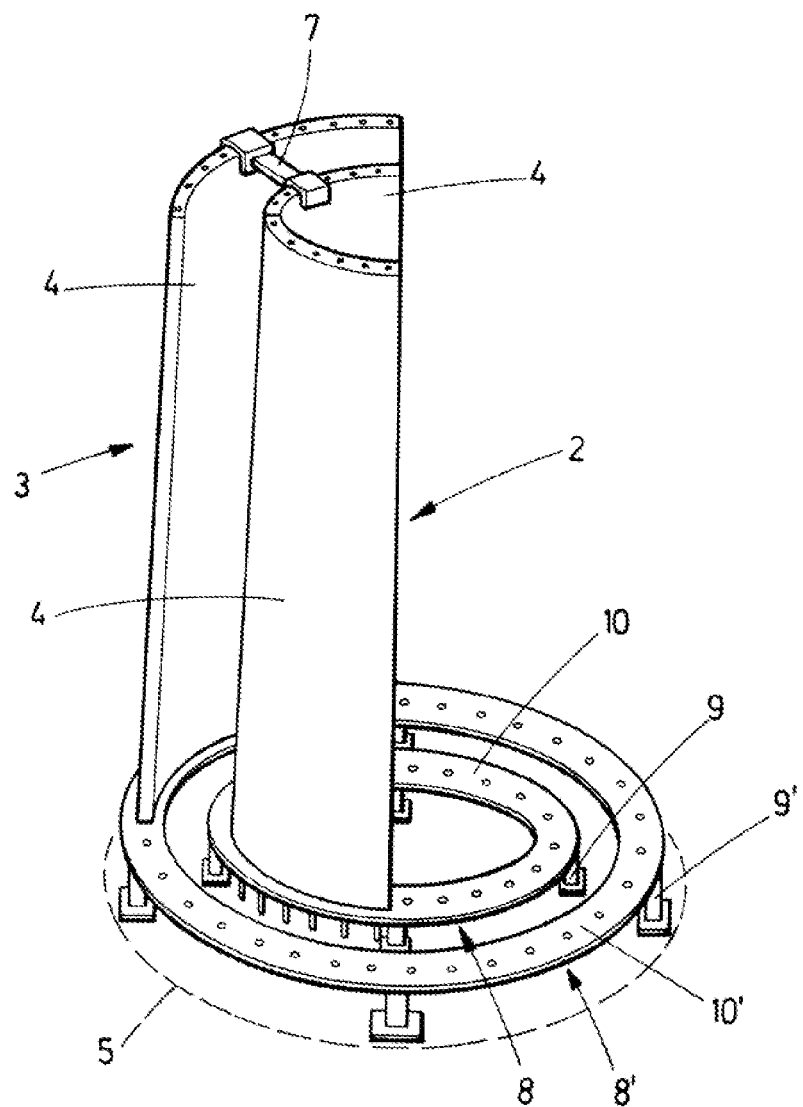
FIG. 4 shows a perspective view of the positioning stage of the pre-assembly phase wherein the at least two precast concrete segments of each of the stackable annular sections are disposed vertically in an adjacent manner, in such a way that the joining flanges between them are disposed adjacent to each other, wherein one of the precast concrete segments of the outer section has not been represented for greater clarity.
Figure 5:
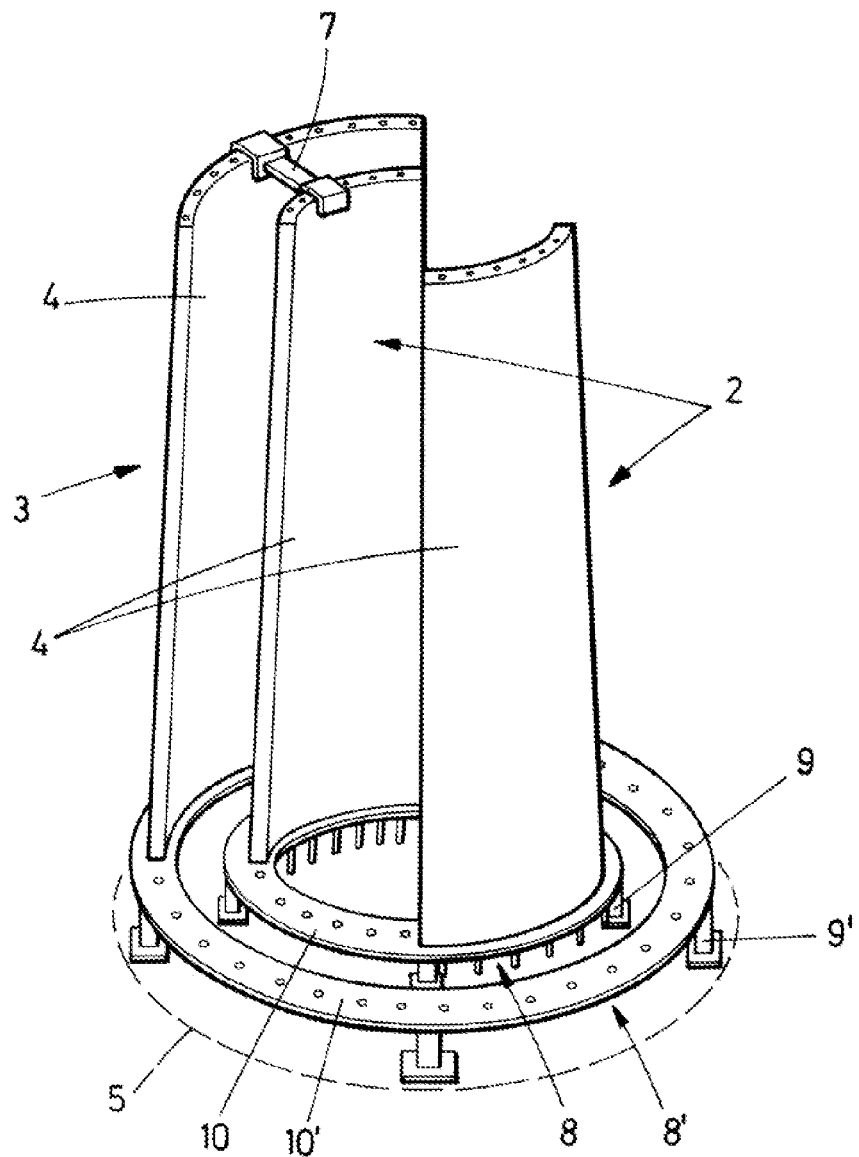
FIG. 5 shows a perspective view of the positioning stage of the pre-assembly phase wherein the at least two precast concrete segments of each of the stackable annular sections are disposed vertically opposite each other, the at least two precast concrete segments of each of the stackable annular sections not being adjacent, wherein one of the precast concrete segments of the outer section has not been represented for greater clarity.

The pre-assembly phase comprises, prior to the stages of joining the at least two precast concrete segments (4) of each of the stackable annular sections (2, 3, 2'), a stage of positioning the precast concrete segments (4) which comprises disposing the at least two precast concrete segments (4) of each of the stackable annular sections (2, 3, 2') vertically in an adjacent manner, in such a way that the joining flanges between them (4) are disposed adjacent to each other, as shown in FIG. 4 or vertically opposite each other, with the at least two precast concrete segments (4) of each of the stackable annular sections (2, 3, 2') not being adjacent, as shown in FIG. 5.

The positioning stage of the precast concrete segments (4) of the first stackable annular section (2) is carried out with respect to one of the pre-assembly zones (5, 5') and the positioning stage of the precast concrete segments (4) of the second stackable annular section (3) is carried out with respect to the first stackable annular section (2). The positioning stage of the precast concrete segments (4) of the first stackable annular section (2) is carried out by fixing the position of the precast concrete segments (4) with respect to a reference point located in the first pre-assembly zone (5), whereas the positioning stage of the precast concrete segments (4) of the second stackable annular section (3) is carried out by fixing the position of the precast concrete segments (4) with respect to a reference point located on the first stackable annular section (2).

The positioning stage of the precast concrete segments (4) of the first stackable annular section (2) with respect to the pre-assembly zone (5) is carried out by means of struts (6) to position and support each precast concrete concrete segment (4) and the positioning stage of the precast concrete segments (4) of the second stackable annular section (3) with respect to the first stackable annular section (2) or to a stackable annular section that is the nearest confined within the inner space of the second stackable annular section (3) is carried out by means of support elements (7), wherein the positioning stage of the precast concrete segments (4) of the second stackable annular section (3) with respect to the first stackable annular section (2) or to the stackable annular section that is nearest confined within the inner space of the second stackable annular section (3) is carried out either by pre-assembling the support element (7) on the first stackable annular section (2), preferably on the nearest stackable annular section confined within the inner space of the second stackable annular section (3), or by pre-assembling the support element (7) on the second stackable annular section (3), in such a way that struts are not required to carry out the positioning of the rest of the stackable annular sections (3). Subsequently, the precast concrete segment (4) of the stackable annular section on which the support element (7) has not been pre-assembled is placed and said precast concrete segment (4) is supported and/or fixed to said support element (7).

The support elements (7) allow positioning the precast concrete segments (4) of the second stackable annular section (3) by fixing the distance from at least one point of them (4) with respect to the precast concrete segments (4) of the first stackable annular section (2). At the same time, the struts (6) allow to position the precast concrete segments (4) of the first stackable annular section (2) by fixing the distance from at least one point of them (4) with respect to the first pre-assembly zone (5).

The stages of joining the at least two precast concrete segments (4) of one stackable annular section (2, 3) carried out for at least the first stackable annular section (2) and the second stackable annular section (3) are provisional joining stages, by means of provisional joining means, which in this example of embodiment, are hydraulic jacks (not shown).

The method for assembling decreasing section concrete towers for wind turbines also comprises a phase of stacking of a stackable annular section (3) on the base (1) of the tower and of a stackable annular section (2) on a stackable annular section (3) immediately below.

In one embodiment, the method for assembling decreasing section concrete towers for wind turbines comprises a pre-assembly phase of concrete tower sections, wherein the tower comprises at least three stackable annular sections (2, 3, 2'), a first stackable annular section (2), a second stackable annular section (3) with a greater section than the first stackable annular section (2) and a third stackable annular section (2') whose section is greater than the section of the first stackable annular section (2) and smaller than the section of the second stackable annular section, wherein the stackable annular sections (2, 3, 2') comprise in turn at least two precast concrete segments (4) and wherein the pre-assembly phase comprises stages of joining the at least two precast concrete segments (4) of the first stackable annular section (2), of the second stackable annular section (3) and of the third stackable annular section (2'), wherein the pre-assembly phase of the first stackable annular section (2) and the second stackable annular section (3) is carried out in a first pre-assembly zone (5) near to the base (1) of the tower and wherein the pre-assembly phase of the third stackable annular section (2') is carried out in a second pre-assembly zone (5') near to the base (1) of the tower.

In this variant, as mentioned, the pre-assembly phase is carried out in at least two pre-assembly zones (5, 5') near to the base (1) of the tower, a first pre-assembly zone (5) and a second pre-assembly zone (5'), wherein the at least two precast concrete segments (4) of the first stackable annular section (2) are confined at least partially within the inner space defined by the at least two precast concrete segments (4) of the second stackable annular section (3) in the first pre-assembly zone (5) and the third stackable annular section (2') is joined in the joining stage of the third stackable annular section (2') in the second pre-assembly zone (5').

The joining stage of the first stackable annular section (2) is carried out preferably before the joining stage of the second stackable annular section (3).

In this variant, the method for assembling decreasing section concrete towers for wind turbines comprises also a phase of stacking a stackable annular section (3) on the base (1) of the tower and of stacking a stackable annular section (2, 2') on a stackable annular section (2', 3) immediately below, wherein in a first example of embodiment, the second stackable annular section (3) is stacked on the base of the tower (1), next the third stackable annular section (2') is stacked on the second stackable annular section (3) and next the first stackable annular section (2) is stacked on the third stackable annular section (2').

This is due to the fact that depending on the inclination of the decreasing section of the tower, it is possible that between the first stackable annular section (2) and the second stackable annular section (3), disposed in the first pre-assembly zone (5) there is insufficient space left for disposing the third stackable annular section (2'), which occupies an intermediate place in the tower already assembled between the second stackable annular section (3) and the first stackable annular section (2), and that it has to be disposed in the second pre-assembly zone (5'). In this way, there is more space between the first stackable annular section (2) and the second stackable annular section (3) in the first pre-assembly zone (5).

Figure 6:
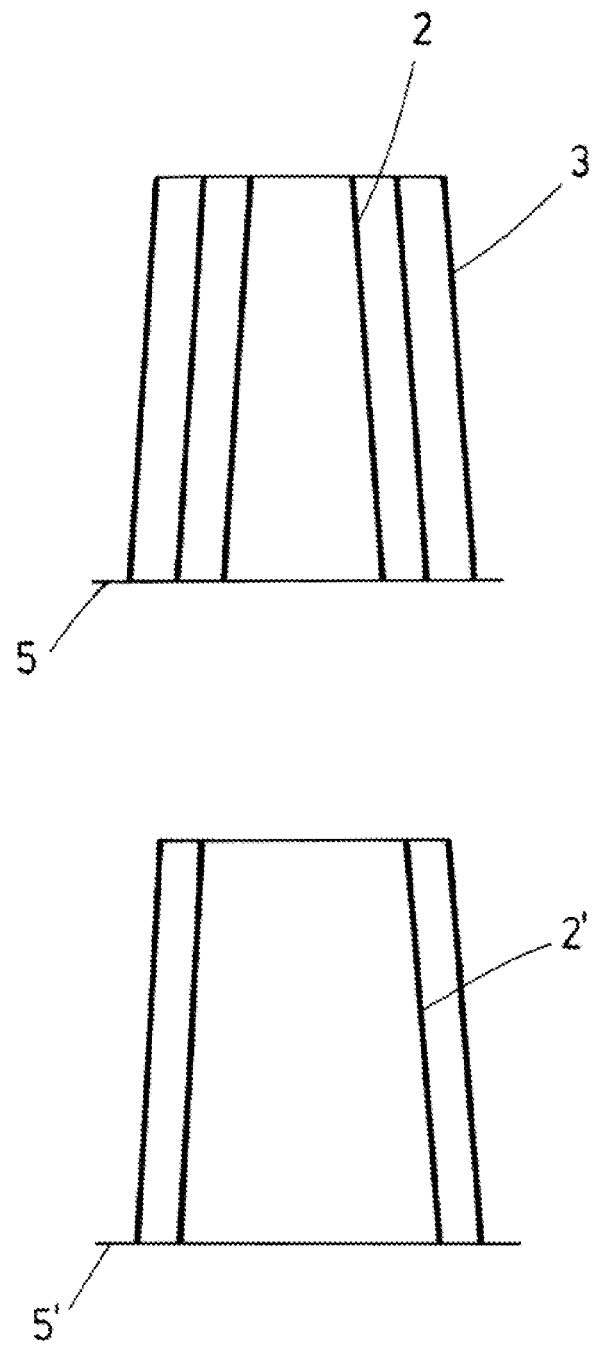
FIG. 6 shows an outline of the pre-assembly phase carried out in two pre-assembly zones, wherein the consecutive stackable annular sections of the tower once stacked, are disposed alternately in two pre-assembly zones, in the event that between the first stackable annular section and the second stackable annular section disposed in the first pre-assembly zone insufficient space is left for disposing a third stackable annular section, disposing said third stackable annular section in a second pre-assembly zone.
Figure 7:
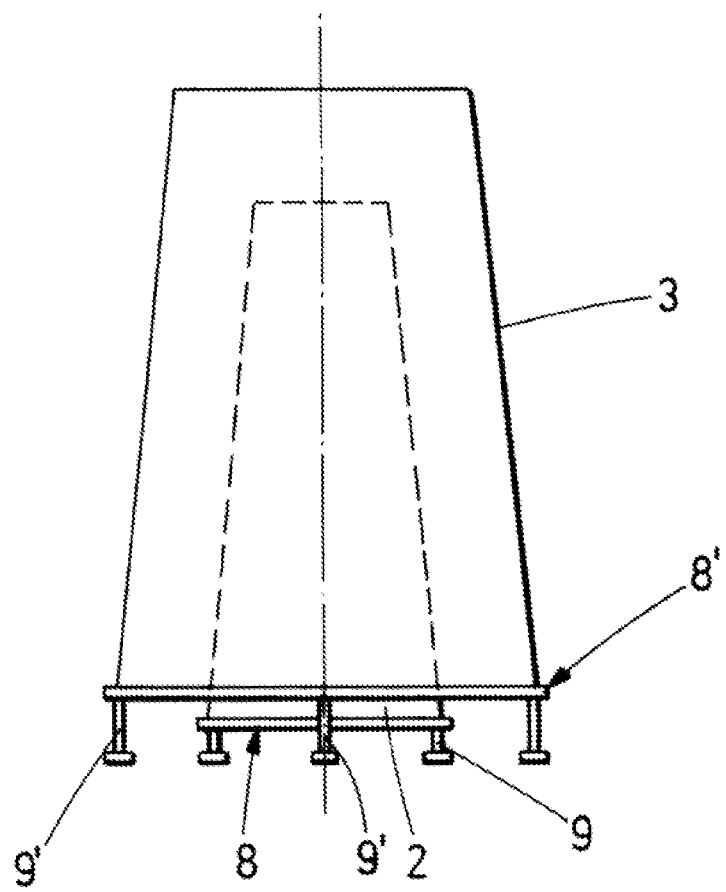
FIG. 7 shows an elevation view of an embodiment of the invention wherein the pre-assembly platform of an outer stackable annular section is disposed at a greater height than the pre-assembly platform of the nearest stackable annular section confined within the inner space of the outer stackable annular section.

Similarly to in the previous variant, the pre-assembly phase could be carried out in the two pre-assembly zones (5, 5') near to the base (1) alternating consecutive stackable annular sections of the tower in each one of the pre-assembly zones (5, 5'), as shown in FIG. 6, in the event that the tower should have more than three stackable annular sections, in such a way that the stacking phase would be carried out by stacking the outermost stackable annular section of the second de pre-assembly zone (5') on the outermost stackable annular section of the first pre-assembly zone (5) and so on successively taking sections first from the first pre-assembly zone (5) and then from the second pre-assembly zone (5') in an alternating manner until stacking all the stackable annular sections of the tower.

The pre-assembly phase comprises the use of a pre-assembly platform (8, 8', 8") disposed in one of the pre-assembly zones (5, 5') for each of the stackable annular sections (2, 3, 2'), wherein on each pre-assembly platform (8, 8', 8") the precast concrete segments (4) of a stackable annular section (2, 3, 2') are disposed, wherein the pre-assembly platforms (8, 8', 8") contribute to the positioning of the precast concrete segments (4) fixing at least two points of the base of said precast concrete segments (4).

It is also especially advantageous that the pre-assembly phase of the at least two stackable annular sections (2, 3, 2') is executed concentrically in such a way that the longitudinal axes of the stackable annular sections (2, 3, 2') coincide. In this way, the process of alignment and control of the inclination of the decreasing section of the tower of the stackable annular sections (2, 3, 2') is more accurate as the stackable annular sections (3, 2') share the reference with respect to another stackable annular section (2) with respect to which (2) the inclination of the tower's decreasing section is verified. In this case, the pre-assembly platforms (8, 8', 8") disposed in each of the pre-assembly zones (5, 5') are disposed concentrically.

Preferably, the pre-assembly platforms (8, 8', 8") are disposed at different heights, so that there is more space between adjacent stackable annular sections, enabling carrying out the pre-assembly phase if the inclination of the tower's decreasing section is insufficient for the first stackable annular section (2) to be housed inside the second stackable annular section (3) with both of them being at the same height, due for example to interferences between elements on the inside of the walls of the second stackable annular section (3) and the outer walls of the first stackable annular section (2). Preferably, the pre-assembly platform (8) of an outer stackable annular section (3) is disposed at a greater height than the pre-assembly platform (8') of the nearest stackable annular section (2) confined within the inner space of the outer stackable annular section (3).

The assembly platforms (8, 8', 8") comprise legs (9, 9', 9") on which discs (10, 10', 10") are disposed. Thus, for example, the pre-assembly platform (8') of the second stackable annular section (3) has longer legs (9') than the legs (9) of the pre-assembly platform (8) of the first stackable annular section (2). In this way, an upper surface of the disc (10') of the pre-assembly platform (8') on which rest the precast concrete segments (4) of the second stackable annular section (3) is located at a greater height than the upper surface of the disc (10) of the pre-assembly platform (8) on which rest the precast concrete segments (4) of the first stackable annular section (2).

The invention claimed is:

1. Method for assembling decreasing section concrete towers for wind turbines which comprises:
 a pre-assembly phase of concrete tower sections,
   wherein the tower comprises at least two stackable annular sections, a first stackable annular section and a second stackable annular section with a greater section than the first stackable annular section, wherein the stackable annular sections comprise in turn at least two precast concrete segments and,
 wherein the pre-assembly phase is carried out in at least one pre-assembly zone near to a base of the tower and comprises stages of joining the at least two precast concrete segments of a stackable annular section carried out for at least the first stackable annular section and the second stackable annular section, and
 wherein during the pre-assembly phase the at least two precast concrete segments of the first stackable annular section are confined at least partially within the inner space defined by the at least two precast concrete segments of the second stackable annular section, and wherein the method further comprises:
  a phase of stacking of the at least two stackable annular sections, the first stackable annular section and the second stackable annular section, wherein the second stackable annular section is stacked below the first stackable annular section.

2. The method of claim 1 wherein the stage of joining the at least two precast concrete segments of a stackable annular section carried out for at least the first stackable annular section and the second stackable annular section are provisional joining stages carried out using provisional joining means used during part or the entire method for assembling decreasing section concrete towers.

3. The method of claim 2 wherein the pre-assembly phase comprises, previously to the phases of joining the at least two precast concrete segments of each of the stackable annular sections, a positioning stage of the precast concrete segments which comprises disposing the at least two precast concrete segments of each of the stackable annular sections vertically opposite each other, the at least two precast concrete segments of each of the stackable annular sections being not adjacent.

4. The method of claim 1 wherein the stages of joining the at least two precast concrete segments of a stackable annular section carried out for at least the first stackable annular section and the second stackable annular section are definitive joining stages carried out using definitive joining means so that the tower once assembled withstands loads of the wind turbine during its operation.

5. The method of claim 4 wherein the pre-assembly phase comprises, previously to the phases of joining the at least two precast concrete segments of each of the stackable annular sections, a positioning stage of the precast concrete segments which comprises disposing the at least two precast concrete segments of each of the stackable annular sections vertically opposite each other, the at least two precast concrete segments of each of the stackable annular sections being not adjacent.

6. The method of claim 1, wherein the stage of joining the at least two precast concrete segments of the first stackable annular section is carried out before the stage of joining the at least two precast concrete segments of the second stackable annular section.

7. The method of claim 6 wherein the pre-assembly phase comprises, previously to the phases of joining the at least two precast concrete segments of each of the stackable annular sections, a positioning stage of the precast concrete segments which comprises disposing the at least two precast concrete segments of each of the stackable annular sections vertically opposite each other, the at least two precast concrete segments of each of the stackable annular sections being not adjacent.

8. The method of claim 1, wherein the pre-assembly phase comprises, previously to the phases of joining the at least two precast concrete segments of each of the stackable annular sections, a positioning stage of the precast concrete segments which comprises disposing the at least two precast concrete segments of each of the stackable annular sections vertically in an adjacent manner, in such a way that joining flanges between the at least two precast concrete segments are disposed adjacent to each other.

9. The method of claim 8, wherein the positioning stage of the precast concrete segments of the first stackable annular section is carried out with respect to one of the pre-assembly zones and the positioning stage of the precast concrete segments of the second stackable annular section is carried out with respect to the first stackable annular section.

10. The method of claim 9, wherein the positioning stage of the precast concrete segments of the first stackable annular section with respect to the pre-assembly zone is carried out by means of struts to position and support each precast concrete segment, and the positioning stage of the precast concrete segments of the second stackable annular section with respect to the first stackable annular section is carried out by means of support elements.

11. The method of claim 10, wherein the positioning stage of the precast concrete segments of the second stackable annular section with respect to the first stackable annular section is carried out either by pre-assembling the support element on the first stackable annular section, or by pre-assembling the support element on the second stackable annular section.

12. The method of claim 1, wherein the pre-assembly phase comprises, previously to the phases of joining the at least two precast concrete segments of each of the stackable annular sections, a positioning stage of the precast concrete segments which comprises disposing the at least two precast concrete segments of each of the stackable annular sections vertically opposite each other, the at least two precast concrete segments of each of the stackable annular sections being not adjacent.

13. The method of claim 1, wherein the tower comprises also a third stackable annular section whose section is greater than the section of the first stackable annular section and smaller than the section of the second stackable annular section, and which in turn comprises at least two precast concrete segments, characterised in that the pre-assembly phase comprises stages of joining the at least two precast concrete segments of the third stackable annular section, wherein the pre-assembly phase of the first stackable annular section and the second stackable annular section is carried out in a first pre-assembly zone near to the base of the tower and wherein the pre-assembly phase of the third stackable annular section is carried out in a second pre-assembly zone near to the base of the tower.

14. The method of claim 1 wherein in the phase of stacking of the at least two stackable annular sections, the second stackable annular section is stacked immediately below the first stackable annular section.

15. The method of claim 14 wherein the tower comprises also a third stackable annular section whose section is greater than the section of the first stackable annular section and smaller than the section of the second stackable annular section, and which in turn comprises at least two precast concrete segments, characterised in that the pre-assembly phase comprises stages of joining the at least two precast concrete segments of the third stackable annular section, wherein the pre-assembly phase of the first stackable annular section and the second stackable annular section is carried out in a first pre-assembly zone near to the base of the tower and wherein the pre-assembly phase of the third stackable annular section is carried out in a second pre-assembly zone near to the base of the tower and wherein in the stacking phase the second stackable annular section is stacked on the base of the tower, next the third stackable annular section is stacked on the second stackable annular section and then the first stackable annular section is stacked on the third stackable annular section.

16. The method of claim 1 wherein in the pre-assembly phase is used a pre-assembly platform disposed in one of the pre-assembly zones for each of the stackable annular sections, wherein on each pre-assembly platform the precast concrete segments of a stackable annular section are disposed.

17. The method of claim 16 wherein the pre-assembly platforms are disposed at different heights.

18. The method of claim 17 wherein the pre-assembly platform of an outer stackable annular section is disposed at a greater height than the pre-assembly platform of the nearest stackable annular section confined within the inner space of the outer stackable annular section.

19. The method of claim 1 wherein the pre-assembly phase of the at least two stackable annular sections is carried out concentrically in such a way that the longitudinal axes of the stackable annular sections coincide.

20. The method of claim 19 wherein in the pre-assembly phase is used a pre-assembly platform disposed in one of the pre-assembly zones for each of the stackable annular sections, wherein on each pre-assembly platform the precast concrete segments of a stackable annular section are disposed and wherein the pre-assembly platforms disposed in each of the pre-assembly zones are disposed concentrically.

* * * * *